US011859438B2

(12) United States Patent
Fielding

(10) Patent No.: US 11,859,438 B2
(45) Date of Patent: *Jan. 2, 2024

(54) BEAD FOR A FRAME MEMBER

(71) Applicant: AANCO (UK) LIMITED, Billingham (GB)

(72) Inventor: Thomas Andrew Fielding, Stockton-on-Tees (GB)

(73) Assignee: AANCO (UK) LIMITED, Billingham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,943

(22) Filed: Apr. 20, 2022

(65) Prior Publication Data

US 2022/0243525 A1 Aug. 4, 2022

Related U.S. Application Data

(63) Continuation of application No. 15/734,432, filed as application No. PCT/GB2019/051167 on Apr. 26, 2019, now Pat. No. 11,352,830.

(30) Foreign Application Priority Data

Jun. 5, 2018 (GB) ..................................... 1809168

(51) Int. Cl.

*E06B 3/58* (2006.01)
*E06B 3/54* (2006.01)
*E06B 3/263* (2006.01)

(52) U.S. Cl.

CPC .......... *E06B 3/5828* (2013.01); *E06B 3/5409* (2013.01); *E06B 3/26301* (2013.01); *E06B 3/5481* (2013.01)

(58) Field of Classification Search

CPC ........ E06B 3/54; E06B 3/5481; E06B 3/5821; E06B 3/58; E06B 3/5828; E06B 3/5871; E06B 3/5409

See application file for complete search history.

(56) References Cited

U.S. PATENT DOCUMENTS 5,544,457 A * 8/1996 Labrecque ............ E06B 3/5835 52/844
7,040,062 B2 * 5/2006 Emek ........................ E06B 5/12 52/214

(Continued)

FOREIGN PATENT DOCUMENTS

AT 521503 B1 * 2/2020 ........... E06B 3/5409
AT 521503 B1 2/2020

(Continued)

OTHER PUBLICATIONS

Combined Search and Examination Report, dated Oct. 26, 2018, 7 pages, UK Intellectual Property Office.

(Continued)

*Primary Examiner* — Ryan D Kwiecinski
(74) *Attorney, Agent, or Firm* — Husch Blackwell LLP

(57) ABSTRACT

A bead for releasably securing a glazing unit to a frame member, comprising a body having a first end and a second end, and a resiliently deformable member secured to the body and having a first finger extending from the body to a first end, and a second finger extending from the first finger to a second end. The first end of the body and the first end of the first finger are configured to engage with respective first and second ends of a frame member so as to secure the bead to the frame member. The second end of the body is configured to secure a glazing unit against an opposed seal of the frame member. The body comprises a first material having a first stiffness and the deformable member com- (Continued)

prises a second material having a second stiffness less than the first stiffness.

2 Claims, 4 Drawing Sheets

(56) References Cited

U.S. PATENT DOCUMENTS

| | | | | |
|---|---|---|---|---|
| 9,683,402 | B2 * | 6/2017 | Abdul Lathief | E04F 11/1846 |
| 10,626,662 | B2 * | 4/2020 | Philips | E06B 3/2632 |

FOREIGN PATENT DOCUMENTS

| | | | | | |
|---|---|---|---|---|---|
| CN | 108999523 | A | | 12/2018 | |
| CN | 108999523 | A | * | 12/2018 | E06B 3/263 |
| DE | 3809384 | A1 | | 9/1989 | |
| DE | 10131287 | A1 | * | 8/2002 | E06B 3/305 |
| DE | 10131287 | A1 | | 8/2002 | |
| DE | 20117000 | U1 | * | 3/2003 | E06B 3/025 |
| DE | 20117000 | U1 | | 4/2003 | |
| DE | 10356575 | A1 | | 10/2004 | |
| DE | 10356575 | A1 | * | 10/2004 | E06B 1/325 |
| DE | 102013000322 | A1 | | 7/2014 | |
| DE | 102013000322 | A1 | * | 7/2014 | E06B 3/5821 |
| EP | 2136024 | A1 | * | 12/2009 | E06B 3/26303 |
| EP | 2136024 | A1 | | 12/2009 | |
| EP | 2642060 | A1 | * | 9/2013 | E06B 3/26301 |
| EP | 2642060 | A1 | | 9/2013 | |
| EP | 3246505 | A1 | | 11/2017 | |
| EP | 3246505 | A1 | * | 11/2017 | E06B 3/26305 |
| GB | 2131860 | A | | 6/1984 | |
| GB | 2225051 | A | | 5/1990 | |
| GB | 2254357 | A | | 10/1992 | |
| KR | 2017000096 | U | * | 1/2017 | E06B 3/54 |
| KR | 2019012778 | A | * | 2/2019 | E06B 3/5481 |

OTHER PUBLICATIONS

PCT International Search Report, dated Jun. 25, 2019, 3 pages, European Patent Office.

* cited by examiner

BEAD FOR A FRAME MEMBER

CROSS-REFERENCE TO RELATED APPLICATIONS

This application is a Continuation of and claims priority to U.S. patent application Ser. No. 15/734,432, filed on Dec. 2, 2020, to Thomas Andrew Fielding, entitled "A Bead For A Frame Member," currently pending, which is a national stage entry of PCT/GB2019/051167, filed on Apr. 26, 2019, to Thomas Andrew Fielding, entitled "A Bead For A Frame Member," the entire disclosures of which are incorporated herein by reference.

FIELD OF INVENTION

The present invention relates to a bead for releasably securing a glazing unit to a frame member.

BACKGROUND OF INVENTION

Doors or windows incorporating glazing typically utilise a glazing bead to sandwich the glazing unit, often a sheet of glass, in the door or window frame. The bead is typically used in combination with a gasket, as this allows the bead to apply a force against the glass without damaging the glass when the bead is secured in place. The bead sandwiches the glazing between opposed gaskets which and applies a compressive force to hold the glazing securely in place. The gaskets also create a watertight seal around the perimeter of the glazing, which prevents liquid from passing around the glazing in the frame of the door or window and passing through the door or window. Without the bead, the glazing unit would not be held securely in the door or window frame.

One of the drawbacks with existing glazing beads is the time taken to install a door or window. The process of fitting the glazing bead properly such that the gaskets apply an appropriate force to secure the glazing in place requires considerable skill and time to perform. If this process is rushed and the glazing unit or the gasket is damaged during installation, an installer will need to replace the damaged piece and start again from the beginning. Furthermore, the door or window may not allow for disassembly, as the joints used to secure the frame in place may not be releasable. In this case, an installation may be further delayed. The material of the door or window frame can determine what method an installer uses to separate the glazing bead from the door frame. For example, a polyvinylchloride (PVC) door will require a different approach to an aluminium or wooden door.

If glazing within a polyvinylchloride (PVC) frame systems needs to be replaced, an installer will typically force a sharp tool, such as a chisel, between the door or window frame and the bead to remove the glazing bead. This approach is only viable because of the flexibility of PVC. If the glazing is within an aluminium frame system, using the previously described method carries a high risk of causing considerable aesthetic damage, as well as structural damage to the frame and the glazing bead. Further, an installer must remove the entire wedge gasket before being able to replace the glazing unit. Typically, this results in damage to the gasket and therefore a replacement wedge gasket is often required when replacing a glazing unit. This is both time-inefficient and cost-inefficient.

The present invention seeks to address at least some of these problems.

SUMMARY OF THE INVENTION

Viewed from a first aspect, the present invention provides a bead for releasably securing a glazing unit to a frame member, comprising a body having a first end and a second end, and a resiliently deformable member secured to the body and having a first finger extending from the body to a first end, and a second finger extending from the first finger to a free distal end is provided. The first end of the body and the first end of the first finger may be configured to engage with respective first and second ends of a frame member and secure the bead to the frame member. The second end of the body may be configured to secure a glazing unit against an opposed end of the frame member, and the first end of the first finger may be configured to separate from the second end of the frame member upon application of an external force to the distal end of the second finger, whereby to release the bead from the frame member.

This provides a bead that can be quickly and easily assembled and disassembled from a frame without risking damage to the frame or the bead.

Viewed from a further independent aspect, the present invention provides a bead for releasably securing a glazing unit to a frame member, comprising a body having a first end and a second end, and a resiliently deformable member secured to the body and having a first finger extending from the body to a first end, and a second finger extending from the first finger to a second end. The first end of the body and the first end of the first finger are configured to engage with respective first and second ends of a frame member so as to secure the bead to the frame member. The second end of the body is configured to releasably secure a gasket in a first position so as to secure a glazing unit against an opposed end of the frame member. Upon application of an external force to the gasket, the gasket is translated to a second position, thereby deflecting the second finger from a first position to a second position. The first finger is configured to separate from the second end of the frame member upon deflection of the second finger to the second position, so as to release the bead from the frame member.

This is advantageous as such a bead can be released without needing to directly apply force to the second finger. A further advantage of this bead is there is no requirement to provide a tool that can access the internal space between the bead and the glazing unit.

The external force may be applied directly to the gasket. The external force may be applied directly to the distal end of the second finger.

The second end of the body may comprise a first portion configured to grip the gasket in the first position.

A distal portion of the second finger may be configured to secure the gasket in the first position.

The distal portion of the second finger may extend in a first direction and the first portion of the of the second end of the body may extend in a direction substantially parallel to the first direction.

The body of the bead may comprise a first material having a first stiffness, and the resiliently deformable member may comprise a second material having a second stiffness less than the first stiffness.

The resiliently deformable member may comprise a plastic material. The plastic material may comprise any of a polyamide, a flexible or rigid polyvinylchloride (PVC), an ultra low density polyethylene (ULDPE), a low density polyethylene (LDPE), a medium density polyethylene (MDPE), a high density polyethylene (HDPE), a polypropylene, a polystyrene, a thermoplastic elastomer (TPE), a thermoplastic polyurethane (TPU), a polyurethane, a polycarbonate, or a nylon material.

Optionally, the first end of the body or the first end of the first finger may be configured to form part of respective first and second connections with the frame member.

The first and second connections may be mechanical snap-fit joints.

The first finger may extend in a second direction and a proximal portion of the second finger may extend in a third direction. The second direction may be different to the third direction. The second direction may be substantially perpendicular to the third direction.

The distal end of the second finger may curve away from the first end of the first finger. The second finger may have a width and the width may decrease along the length of the second finger to the free distal end.

The second end of the body may be configured to form a gap with the second end of the frame member when secured to the frame member, and the second finger may extend through the gap.

The body may be made from timber, PVC or aluminium. The resiliently deformable member may be made from plastic. The resiliently deformable member may comprise a polyamide material. The resiliently deformable member may comprise an extrudable polymer. The resiliently deformable member may comprise one or more polymer based composite pultruded materials. By providing a bead having different materials, the benefits of each material may be exploited to provide a bead having superior properties compared to a bead made solely from one material. Specifically, a bead that has a flexible clip provides a bead that is stiff overall, but incorporates elastic elements that can be elastically deformed or deflected as required without damaging the bead. This allows the bead to be clipped on and off easily, by either rolling the bead onto the frame and 'clicking' the clip into position, or pressing onto the clip or gasket to release the clip and allowing the bead to be rolled off the frame. Being able to attach and release the bead in this manner considerably reduces the time to install and/or remove or replace parts of the frame and substantially eliminates the risk of damaging the bead or frame, as it is no longer necessary to prise the frame and bead apart.

The body may have a first length and the resiliently deformable member may have a second length different to the first length. The first length may be greater than the second length.

In a further example, there is also provided a method of removing a bead from a frame member, comprising the steps of providing a bead for releasably securing a glazing unit to a frame member, the method comprising: a body having a first end and a second end, and a resiliently deformable member secured to the body and having a first finger extending from the body to a first end, and a second finger extending from the first finger to a free distal end, wherein the first end of the body and the first end of the first finger are configured to engage with respective first and second ends of a frame member and secure the bead to the frame member, wherein the second end of the body is configured to secure a glazing unit against an opposed end of the frame member, and wherein the first end of the first finger is configured to separate from the second end of the frame member upon application of an external force to the distal end of the second finger, applying a force to the distal end of the second finger using an external tool, releasing the first end of the first finger from the second end of the frame member, and releasing the bead from the frame member.

In a further example, there is also provided a kit of parts comprising a bead and instructions to carry out the method of removing a bead from a frame member. The kit of parts may further comprise an external tool configured to apply a force to the distal end of the second finger.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views.

DETAILED DESCRIPTION OF THE INVENTION

While the subsequent description is in relation to windows or doors having a glazing bead to secure a glazing unit, typically a sheet of glass, the application of the present invention is not limited to windows and doors, but to any such system having a glazing unit secured by a glazing bead.

Figure 1B:
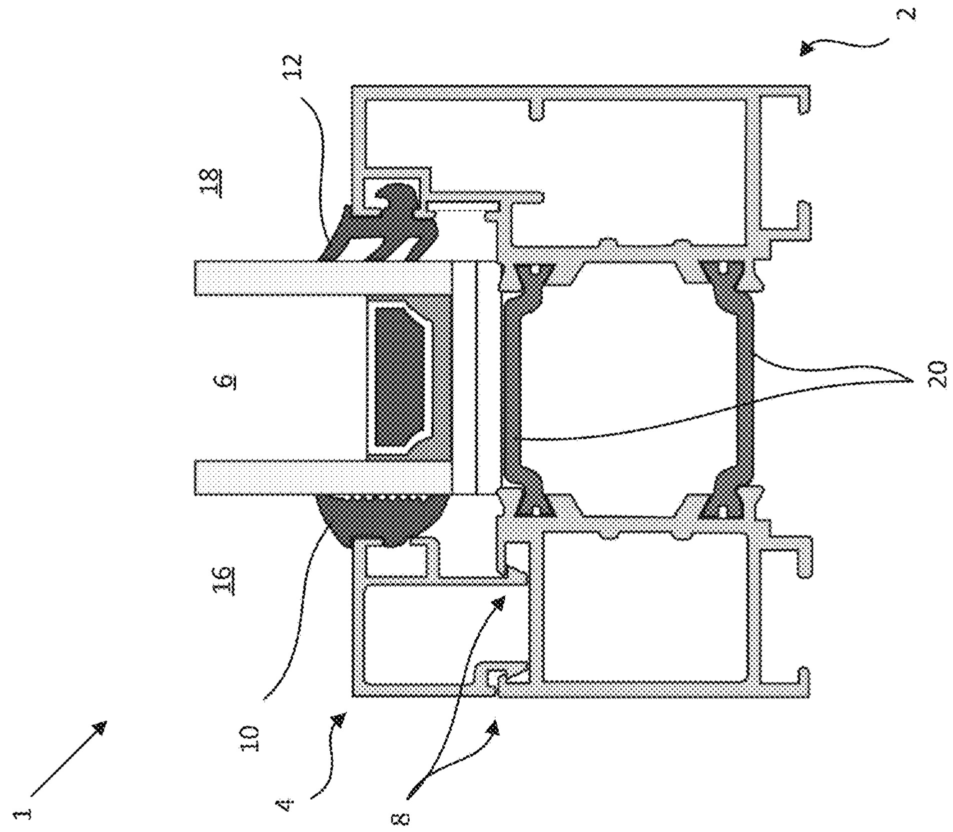
FIGS. 1A and 1B illustrate prior art frame systems.
Figure 1A:
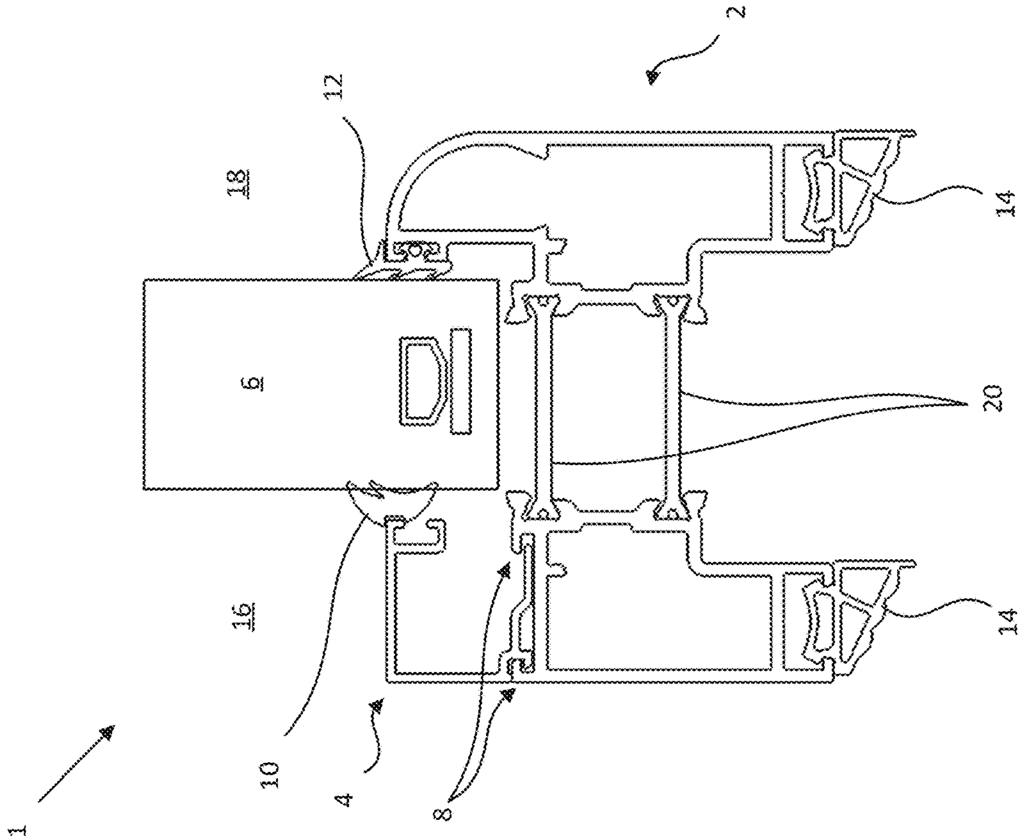

FIGS. 1A & 1B illustrate prior art frame systems. FIGS. 1A and 1B each illustrate a frame system 1 having a frame 2 and a bead 4 which act to compress glazing 6 between a wedge gasket 10 and a flipper gasket 12. The bead 4 is shown secured to the frame 2 on the inside 16 of a space by two mechanical snap-fit joints. The frame system 1 is also shown incorporating a thermal break 20 to improve the thermal efficiency of the frame system 1. The thermal break spaces the two halves of the frame member 2 and traps a pocket of air within the frame 2 to reduce the thermal conductivity of the frame 2. Outer frame gaskets 14 are also shown secured to the frame 2 of FIG. 1A to provide a watertight seal around the frame 2.

Figure 2:
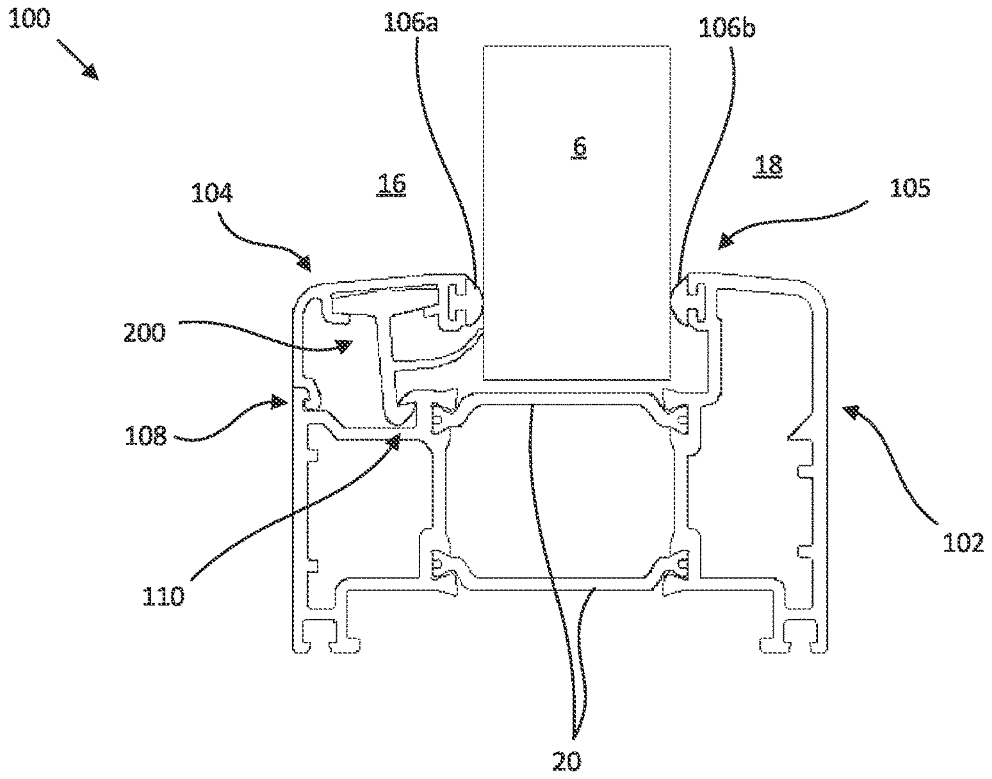
FIGS. 2 and 3 illustrate cross-sectional views of a frame system where a bead is secured to a frame.

FIG. 2 illustrates a cross-sectional view of a frame system 100. The bead 104 is shown as having an "L-shaped" body having first 112 and second 118 ends and a clip 200 secured to the body. The bead 104 is secured to the frame 102 at the first end 112 of the body and at a first end 206 of the clip 200. When the bead 104 is secured to the frame 102, opposed seals 106*a*,106*b* apply a compressive force against a glazing unit 6 which acts to secure the glazing unit 6 in the frame system 100. The frame 102 is also shown having a thermal break 20, which enhances the thermal efficiency of the frame system 100. The subsequent description of the bead 104 will refer to features illustrated both in FIGS. 2 and 3.

Figure 3:
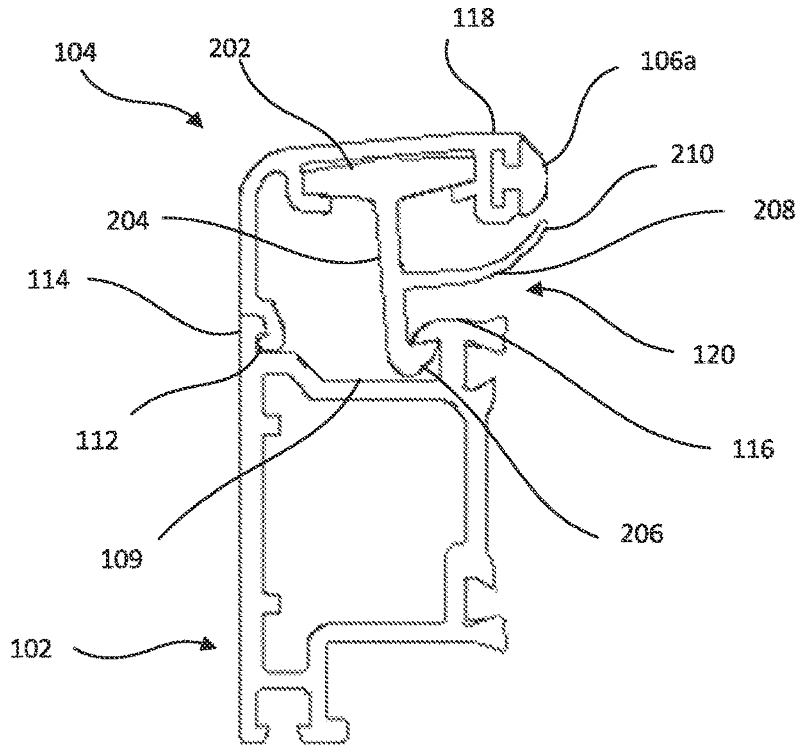

The bead 104 is secured to the frame 102 by first 108 and second 110 connections. As shown in FIGS. 2 and 3, the first connection 108 is formed by the first end 112 of the bead 104 engaging with a corresponding first end 114 of the frame 102. The second connection 110 is formed between the first end 206 of the clip 200 and a corresponding second end 116 of the frame 102. The first 108 and second 110 connections are formed as respective first and second mechanical snap-fit joints, where the first 114 end of the frame 102 and first end 112 of the bead 104 form complementary parts of the snap-fit joint of the first connection 108 and the second 116 end of the frame 102 and first end 206 of the clip 200 form complementary parts of the snap-fit joint of the second connection 110. The snap-fit joint of the first connection 108 is formed by the first end 114 of the frame 102 having a nub coupling with a corresponding nub on the first end 112 of the bead 104 to prevent the corresponding ends 112, 114 being pulled apart. The second connection 110 is formed by the first end 206 of the clip 200 having a nub coupling with a corresponding nub on the second end 116 of the frame 102 to prevent the corresponding ends 206, 116 being pulled apart. Together, the first and second connections secure the bead 104 to the frame 102. While a specific configuration of snap-fit joints have been illustrated here, it would be apparent that other releasable joints or configurations of the first 108 and/or second 110 connections would be included by this description. The bead 104 also has a second end 118 having a seal 106*a* attached thereto. Seal 106*a* is opposed to seal 106*b*, which in combination apply a compressive force to the glazing unit 6 to secure the glazing unit 6 in place when the bead 104 is secured to the frame 102.

The clip 200 is also shown having a base 202 which is secured to the bead 104. The base 202 may be secured to the bead 104 by any of a mechanical or chemical joint. For example, the base 202 may be pressed into a slot or cavity defined within the body of the bead 104 and/or glued or otherwise adhered to the bead 104 to provide a rigid fixation between the base 202 and the body of the bead 104. The clip 200 may be secured by crimping or rolling into a corresponding section of the bead 104. The clip 200 may be secured by an interference fit with the corresponding section of the bead 104. The clip 200 may be secured by inserting into one or more corresponding slots or members (not shown) within the bead and turned to secure the clip 200 in position. The clip 200 is shown having a first finger 204 extending from the base 202 to the first end 206 in a first direction, and a second finger 208 extending from the first finger 204 to a free distal end 210 in a second direction. While the second finger 208 is shown extending from the first finger 204 approximately mid-way along the first finger 204, it would be understood that the second finger 208 may extend from other locations along the first finger 204 to achieve some of the advantages of the present invention. Further, while the second finger 208 extends in a direction substantially perpendicular to the first finger 204, it would be understood that the second finger 208 may extend in other directions with respect to the first finger 204 while retaining the benefits of the present invention. Preferably, the second finger 208 extends in a perpendicular direction to the first finger 204 from a point approximately mid-way along the first finger 204.

The second finger 208 is also illustrated as an arcuate structure which curves towards the second end 118 of the bead 104. However, other shapes and configurations of the second finger 208 are possible, for example, one or more straight sections may be used to obtain the benefits of the present invention. The second finger 208 is also shown extending between a gap 120 formed by the second end 118 of the bead 104 being spaced from the second end 116 of the frame 102. The second finger 208 has a width that tapers from its connection to the first finger 204 to its distal end 210. The width at the connection between the first 204 and second 208 fingers is greater than the width at the distal end 210. Having a tapered second finger 208 allows the distal end 210 to rest against the glazing unit 6 without movement of the glazing unit within the assembled frame 100 releasing the clip 200.

While the bead 104 will have a length sufficient to cover the section of frame 102 it will be secured to, it is not essential for the clip 200 to have a length equal to the bead 104. For example, the clip 200 may be implemented as one single clip 200 extending the length of the bead 104, or only extending for a proportion of the bead 104. In some cases, the length of the clip 200 may be equal to the length of the bead. In some cases, the clip may be 10 mm in length. The clip 200 may have a length between 10 mm and 1000 mm. While specific lengths are provided here as examples, it would be apparent that the clip 200 may have any length as the clip will be suitable for a wide range of frame systems 100 which are suitable for different applications. The frame system 100 may utilise a plurality of clips 200 distributed along the length of the frame 102.

The clip 200 is preferably made from plastic, but it would be understood that other deformable materials would provide suitable alternatives. This would provide a base 202 with the necessary stiffness to remain secured in the body of the bead 104, but also provide first 204 and second 208 fingers with the requisite flexibility to deflect under load to release the bead 104 from the frame 102. Further, by having a deformable clip 200, the bead 104 can apply a compressive force against the glazing unit 6 without the need for an additional wedge gasket 10. The clip 200 may be made from one or more different materials such as plastic. The clip 200 may be made from a polyamide. In some cases, the clip 200 comprises nylon. Nylon is particularly advantageous, due to its combination of strength, extrusion accuracy and stability. Making the clip from plastic also allows for detailing, such as a barbed end, to be included. This provides a clip with functionality that would otherwise not be possible using a stiffer material such as aluminium, as an aluminium clip would yield when deformed to the same degree. While specific materials have been provided as examples, it would be apparent that other materials having suitable material properties would also be suitable. In some cases, the clip 200 has a tensile strength between 40 to 90 MPa. In some cases, the clip 200 has a tensile modulus from 2 to 4 GPa. The body of the bead 104 may be made from any of aluminium, PVC or wood. The bead 104 may be between 15 mm×15 mm and 50 mm×50 mm. The bead 104 may be larger than 50 mm×50 mm. While a bead 104 having a square cross-section has been illustrated in the Figures, it would be apparent that a square cross-section is given by way of example and that the bead 104 need not have a square cross-section. The bead 104 may have a circular, rounded, rectangular or otherwise shaped cross-section depending on the particular aesthetic requirements of the frame system 100.

Figure 4:
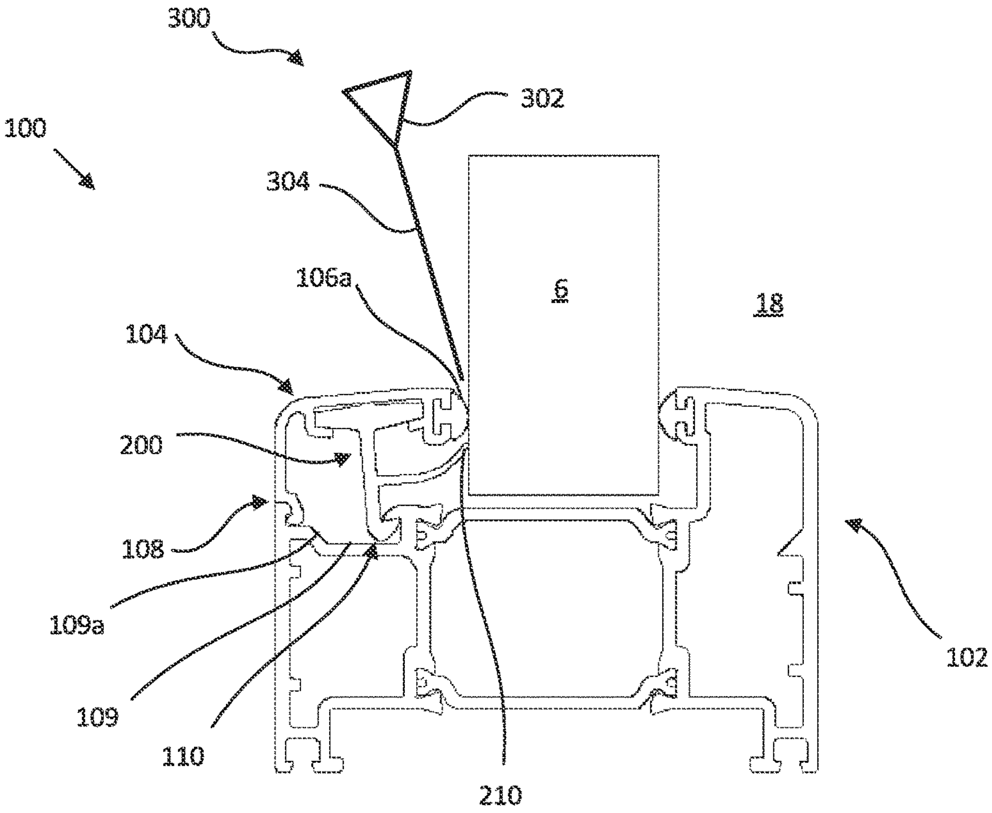
FIG. 4 illustrates how an external tool can be used to remove the bead from the frame.

One of the advantages of the present system 100 is the ease with which the bead 104 can be removed from the frame 102 in a manner which also reduces the risk of damaging the frame 102 or the bead 104. FIG. 4 illustrates how an external tool 300 can be used to remove the bead 104 from the frame 102, for example when the glazing unit 6 becomes damaged. Using an external tool 300 having a base 302 and an elongate portion 304, an installer is able to pass the elongate portion 304 between the glazing unit 6 and the seal 106*a* to engage the distal end 210 of the second finger 208. Once engaged, an installer is able to push the tool 300 against the distal end 210 and apply a force to the second finger 208. This force applies a force to the first finger 204, which in turn causes the first finger 204 to deform. As the first finger 204 deforms, the first end 206 of the first finger 204 moves relative to the second end 116 of the frame 102. The movement of the second finger 208 causes the first end 206 of the first finger 204 to disengage from the second end 110 of the frame 102, releasing the second connection 110. The first finger 204 may extend into a recess 109 in the frame 102. The recess 109 may also include an inclined surface 109*a* configured to urge the first finger 204 away from the frame 102 as it is deflected by the tool 300. To be able to pass between the seal 106*a* and the glazing unit 6 when the glazing unit 6 is secured to the frame 102 and apply a force to the second finger 208, the elongate portion 304 must be sufficiently thin, but stiff to achieve this. An installer is able to manually apply the force to release the second connection 110 by simply pressing down onto the second finger 208, which greatly improves the speed and ease of disassembly of the frame system 100. The tool 300 is typically be between 0.5 mm and 1.0 mm thick. The tool 300 is preferably made from steel, but may also be made from plastics, glass-fibre reinforced plastic, or other metals. The extension 304 may be between 50 mm and 500 mm long. It should be noted, that in some cases, the installer will not have to manually release all of the second connections 110 to release the bead 104 from the frame. For example, when one long clip 200 made is used, after a sufficient length of the clip is released, the installer will be able to rotate the bead 104 free without damaging the clip 200, as the flexibility and geometry of first end 206 and second end 116 will cause the second connection 110 to release without having to engage the second finger 208 with the clip is released, the installer will be able to rotate the bead 104 free without damaging the clip 200, as the flexibility and geometry of first end 206 and second end 116 will cause the second connection 110 to release without having to engage the second finger 208 with the tool 300. The recess 109 is also designed to extend as little as possible into the frame 102 so that the clip 200 does not interfere with any other mechanisms, such as handles and locks, that may be present in the frame 102, while remaining aesthetically pleasing. While the tool 300 has been described as pressing directly down onto the distal end of the second finger 210, it would be apparent this was not essential and one or more other materials may be disposed between the elongate portion 304 and the distal end 210 to release the clip 200.

While the Figures illustrate one example of a clip 200 that is released by pushing the tool 300 to engage the distal end 210 of the second finger 208, it would be understood that a pulling force could be applied by the installer to release the bead 104. One way of achieving this would be to extend the first finger 204 between the second end 116 of the frame member 102 and have the nub on the first end 206 of the first finger 204 pointing away from the glazing unit 6 and having the nub on the second end 116 of the frame member 102 pointing towards the glazing unit 6, so that the second connection 110 is reversed from that shown in FIGS. 2 and 3. This would allow the installer to insert the tool 300 to engage the distal end 210 and apply a tensile force on the distal end 210 to deflect the first finger 204 away from the second end 116, thereby releasing the second connection 110 and allowing the bead 104 to be released from the frame 102.

Once sufficient force has been applied to the distal end 210, the first end 206 of the first finger 204 will be sufficiently displaced with respect to the second end 116 of the frame 102 and release the second connection 110. The installer may keep pressing the tool onto the second finger 208 to further deflect the clip 200 such that the first end 206 of the first finger 204 is spaced from the second end 116 of the frame 102, thus providing additional clearance to release the bead 104 from the frame 102. The installer may then remove the damaged glazing unit 6 from the frame system 100, as the bead 106 is no longer applying a compressive force to the glazing unit 6. In examples, the distal end 210 of the second finger 208 may rest against the glazing unit 6 when the bead 104 is secured to the frame 102. This will increase the likelihood of the elongate portion 304 contacting the distal end 210 of the second finger 208 when inserting the elongate portion 304 into space between the glazing unit 6 and the seal 106*a*.

While the Figures illustrate the movement of the first end 206 as a translation, it would be apparent that the first end 206 may rotate with respect to the second end 116 of the frame 102 to release the second connection 110. Further, while the external tool 300 is described as applying a force to the second finger 208, it would be apparent that the external tool 300 may apply a torque to the second finger 208, which in turn could release the second connection 110 between the first end 206 of the first finger 204 and the second end 116 of the frame 102.

Figure 5:
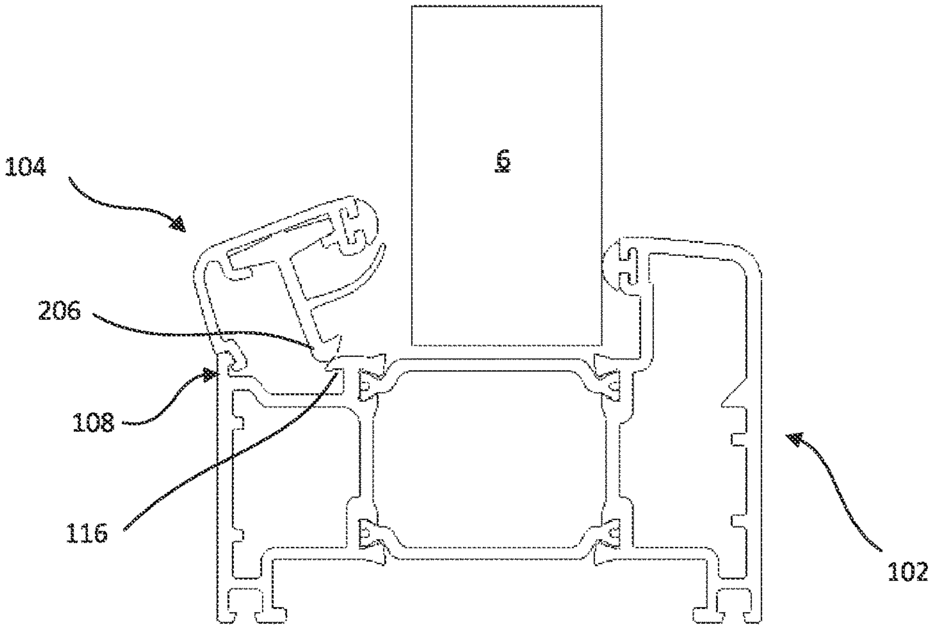
FIG. 5 illustrates the bead after being released from the frame to allow removal of a glazing unit
Figure 6:
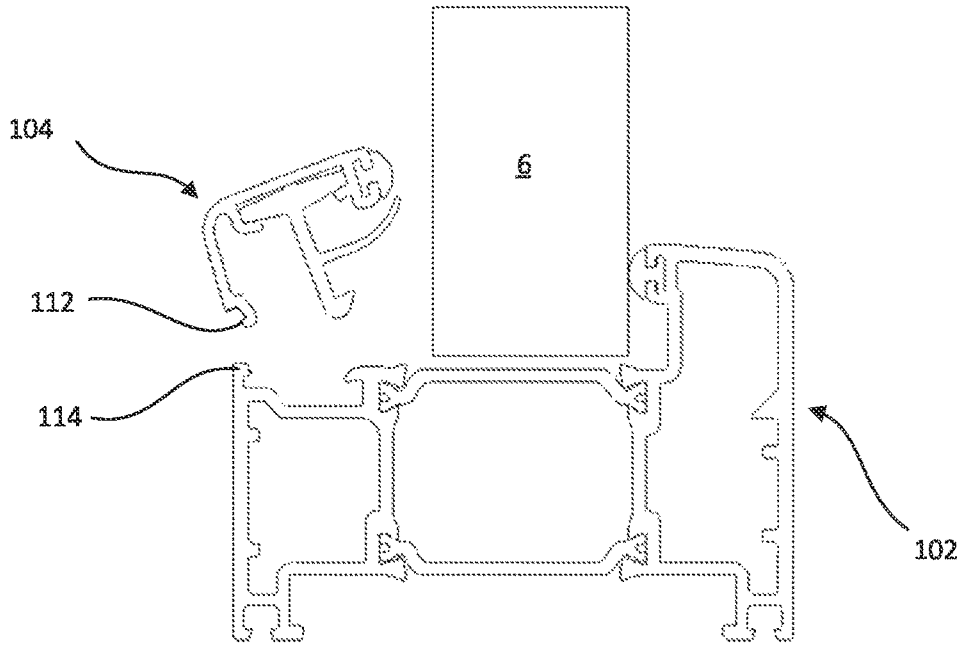
FIG. 6 illustrates the removable bead after separation from the frame.

Once the second connection 110 has been released, only the first connection 108 remains, as illustrated in FIG. 5. The bead 104 may then be rotated relative to the frame 102, anti-clockwise as illustrated in FIG. 5, to space the first end 206 of the first finger 204 from the second end of the frame 102. This removes the reaction force holding the first connection 108 in place and allows for the separation of the bead 104 from the frame 102 (see also FIG. 6).

While the bead 104 of the present invention has advantages in relation to disassembling the frame system 100, the present invention also has benefits in relation to the assembly of frame systems 100. Where a seal 106*a* is present on the second end 118 of bead 104, the installation of the bead 104 is considerably simpler compared to prior art beads 4. An installer simply couples the first end 112 of the bead 104 to the first end 114 of the frame 102, to form the first connection 108, and rotates the bead 104 towards the glazing unit 6, to bring the first end 206 of the first finger 204 into contact with the second end 116 of the frame 102. The installer then presses the bead 104 onto the frame 102, which causes the first finger 204 to deflect, due to its elasticity, and move relative to the second end 116 of the frame, due to the complementary surfaces of the first end 206 of the first finger 204 and the second end 116 of the frame 102. The installer keeps pressing down until the first end 206 of the first finger 204 couples with the second end 116 of the frame 102 and clips into place, forming the second connection 110. This may be indicated by an audible clicking noise. This simple method secures the bead 104 to the frame 102 and applies a compressive force to hold the glazing unit 6 in place in the frame 102 without the need for an additional wedge gasket 10.

Figure 7:
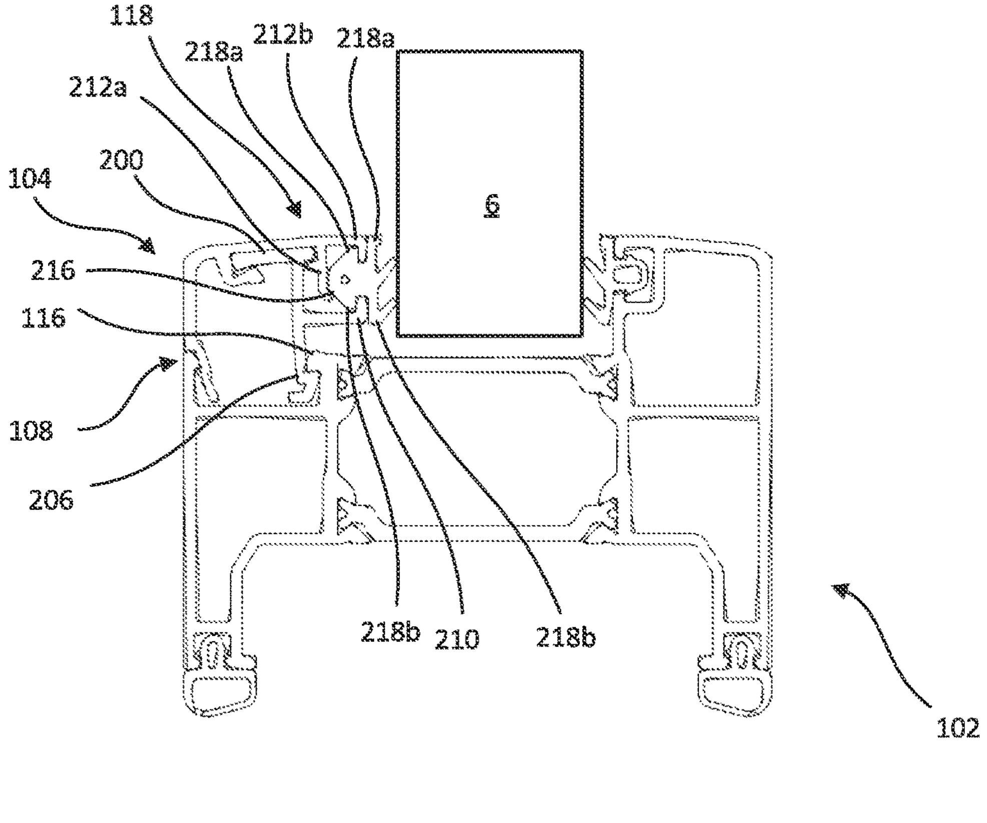
FIG. 7 illustrates a cross-sectional view of a frame system where a bead is released by depressing a gasket.

In an example illustrated in FIG. 7, the bead 104 has a first end which connects to a first end of the frame 102 to provide the first connection 108. The bead 104 also has a second end 118 having a first portion 212*a* and a second portion 212*b* which are configured to secure a gasket 216 extending along a length of the bead 104 in a longitudinal direction. A part of the second portion 212*b* is also shown extending into the gasket 216 and interdigitating with a first pair of fingers 218*a* extending from the gasket 216. The illustrated example is particularly advantageous, as application of an external force to the gasket 216 translates the gasket 216 in a vertical direction away from the second end 118, thus easily releasing the gasket 216 from the second portion 216*b* and displacing the second finger of the clip 200.

The clip 200 illustrated in FIG. 7 is configured in a similar manner to that illustrated in FIGS. 2 to 6. The clip 200 has a body and a first finger extending from the body at a first end to a second end 206. The second end 206 of the first finger engages with the second end 116 of the frame 102 to form a second connection between the bead 104 and the frame 102. The first 108 and second connections secure the bead 104 to the frame 102 and cause the bead 104 to apply a preload to the glazing unit 6, securing the glazing unit 6 in place. This arrangement is advantageous, as it is not necessary to secure an additional wedge gasket to the bead 104 to ensure sufficient pressure is applied to secure the glazing unit 6 in place. This not only reduces the installation time of the door or window, but also reduces the amount of material used. The clip 200 also includes a second finger extending from the first finger to a distal end 210 which is inserted into the gasket 216. In the illustrated example, the second finger comprises a proximal portion extending from the first finger in a substantially perpendicular direction and a distal portion extending from the proximal portion in a further substantially perpendicular direction. In the illustrated example, a part of the distal portion including the distal end 210 interdigitates with a second pair of fingers 218*b* extending from the gasket 216 and helps to secure the gasket 216 against the second portion 212*b*. The distal end 210 is also shown spaced from the glazing unit. Therefore, when the installer presses onto the gasket 216, releasing it from the second end 118, the gasket 216 is translated in the direction of the force.

In one example, the installer presses down onto the gasket 216 and causes the gasket 216 to slide away from the second end 118 of the body in the vertical direction. As the body of the bead 104 is rigid compared to the clip 200, the clip 200 undergoes substantially all of the deformation due to the force applied by the installer. As shown in FIG. 7, displacing the gasket 216 results in a force being applied to the second finger, and consequently the first finger. As the first finger is engaged with the second end 116 of the frame 102, sufficient force needs to be applied to the gasket 216 in order to separate the first finger from the second end of the frame 102. Once sufficient force is applied to the gasket 216, the first finger releases from the frame 102, and the bead 104 can be rolled off the frame 102 to separate the bead 104 from the frame 102, thus providing the installer a simple and efficient way to remove a clip-on bead 104 from a frame member 102. The installer may press down onto the gasket 216 using a hand tool (not shown). The hand tool is preferably configured to enable an installer to push the gasket 216 down and to engage with an end of the bead 104, so as to release the clip 200 from the frame member 102. Once the clip 200 is released, the bead 104 can, for example, be rolled away from the frame member 102 by pulling the tool up along the surface of the glazing unit 6. In one example, the hand tool engages with the bead 104 by hooking onto the second end 118 of the bead 104.

While the first 218*a* and second 218*b* pair of fingers are illustrated extending in a direction substantially perpendicular to the longitudinal axis of the bead 104, it would be apparent this was not essential. While the part of the second portion 212*b* is illustrated as extending into the gasket 216 in a substantially vertical direction, it would be apparent this was not essential. While first 212*a* and second 212*b* portions are illustrated, it would be apparent this was not essential, and the gasket 216 could be secured using either of the first 212*a* or second 212*b* portions. While the distal end 210 is shown inserted into the gasket 216, this is not essential. The distal end 210 may simply rest against an outer surface of the gasket 216, or be spaced from the gasket 216. Furthermore, while the distal end 210 of the second finger and end of the second portion 212*b* are shown inserted into the gasket parallel to each other and in a substantially vertical direction, it would be understood this was also not essential. Where the gasket 216 is spaced from the second finger, application of the external force will first slide the gasket 216 towards the second finger before applying a force to the second finger.

While the external force is described as being applied to the gasket 216, it would be understood that it was not essential for the force to be applied directly to the gasket 216. Intermediate materials or structures may be present between the source of the external force and the gasket 216. These intermediate materials or structures may transfer some or all of the force from the source of the external force and the gasket 216. Similarly, while the gasket 216 is shown contacting the second finger, it would be apparent it was not essential for this contact to be directly between the gasket 216 and the second finger. One or more intermediate materials or structures may be used to transfer some or all of the force from the gasket 216 to the second finger.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of assembling a bead for securing a glazing unit to a frame member, comprising the steps of:

providing a resiliently deformable member having a base and a first finger extending from the base to a first end, the first end being configured to engage with a respective first end of a frame member, providing a body having a first end configured to engage with a respective second end of a frame member, a second end configured, when the bead is secured to the frame, to secure a glazing unit by applying a compressive force against an opposed end of the frame member, and a slot configured to receive the base, and pressing the base of the resiliently deformable member into the slot, so as to secure the base within the slot and deflect thereby applying the compressive force to the second end of the body to secure the glazing unit, wherein the first end of the body and the first end of the first finger are configured to engage with respective first and second ends of a frame member so as to secure the bead to the frame member.

2. A method according to claim 1, wherein the base is pressed into the slot by rolling or crimping.

* * * * *